US009994306B2

(12) United States Patent
Williams et al.

(10) Patent No.: US 9,994,306 B2
(45) Date of Patent: Jun. 12, 2018

(54) AIRCRAFT LANDING GEAR ASSEMBLY STOP MEMBER

(71) Applicant: Safran Landing Systems UK Ltd, Gloucester, Gloucestershire (GB)

(72) Inventors: Lee Williams, Gloucester (GB); Peter Millington, Gloucester (GB); Anthony Foy, Gloucester (GB); Richard Tutton, Gloucester (GB)

(73) Assignee: Safran Landing Systems UK Ltd (GB)

( * ) Notice: Subject to any disclaimer, the term of this patent is extended or adjusted under 35 U.S.C. 154(b) by 358 days.

(21) Appl. No.: 14/993,437

(22) Filed: Jan. 12, 2016

(65) Prior Publication Data

US 2016/0200453 A1    Jul. 14, 2016

(30) Foreign Application Priority Data

Jan. 12, 2015    (EP) ..................... 15150788

(51) Int. Cl.
*B64C 25/26*    (2006.01)
*B64C 25/00*    (2006.01)
*B64C 25/10*    (2006.01)
*B64F 5/10*    (2017.01)

(52) U.S. Cl.
CPC ............ *B64C 25/26* (2013.01); *B64C 25/001* (2013.01); *B64C 25/10* (2013.01); *B64F 5/10* (2017.01)

(58) Field of Classification Search
CPC ....... B64C 25/26; B64C 25/001; B64C 25/10; B64F 5/10
See application file for complete search history.

(56) References Cited

U.S. PATENT DOCUMENTS

| | | | | |
|---|---|---|---|---|
| 4,408,646 | A * | 10/1983 | Forsyth | B60C 27/20 152/179 |
| 5,333,816 | A * | 8/1994 | Del Monte | B64C 25/50 244/102 |
| 5,460,474 | A | 10/1995 | Iles | |
| 8,390,479 | B2 * | 3/2013 | Wilby | B64C 25/26 244/100 R |
| 2003/0111576 | A1 | 6/2003 | Reniau | |
| 2009/0057485 | A1 | 3/2009 | Seror-Goguet | |
| 2009/0101754 | A1* | 4/2009 | O'Connell | B64C 25/50 244/102 SL |
| 2011/0147151 | A1 | 6/2011 | Saubade | |
| 2012/0132742 | A1* | 5/2012 | O'Connell | B64C 25/50 244/100 R |

(Continued)

FOREIGN PATENT DOCUMENTS

| | | |
|---|---|---|
| FR | 2963606 | 2/2012 |
| GB | 811741 | 4/1959 |
| GB | 2477127 | 7/2011 |

(Continued)

OTHER PUBLICATIONS

Extended European Search Report dated Jun. 30, 2015 for European Application No. 15150788.6-1754.

*Primary Examiner* — Justin M Benedik
(74) *Attorney, Agent, or Firm* — RatnerPrestia

(57) ABSTRACT

An aircraft landing gear assembly stop member is arranged to be coupled to a first part of an aircraft landing gear assembly and includes a pair of projections which control movement of a second part of the landing gear assembly.

12 Claims, 5 Drawing Sheets

(56) References Cited

U.S. PATENT DOCUMENTS

2012/0256050 A1 10/2012 Hilliard
2012/0318909 A1 12/2012 Bennett

FOREIGN PATENT DOCUMENTS

| GB | 2480623 | 11/2011 |
| KR | 20030037151 | 5/2003 |
| WO | 2014118576 | 8/2014 |

* cited by examiner

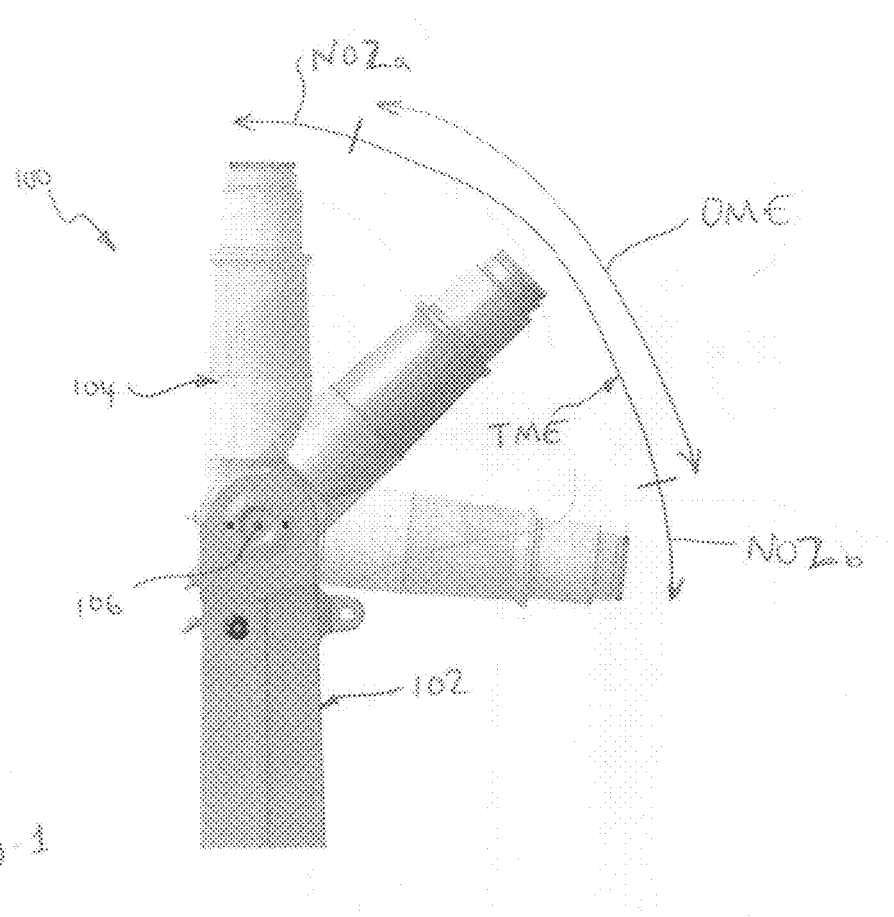
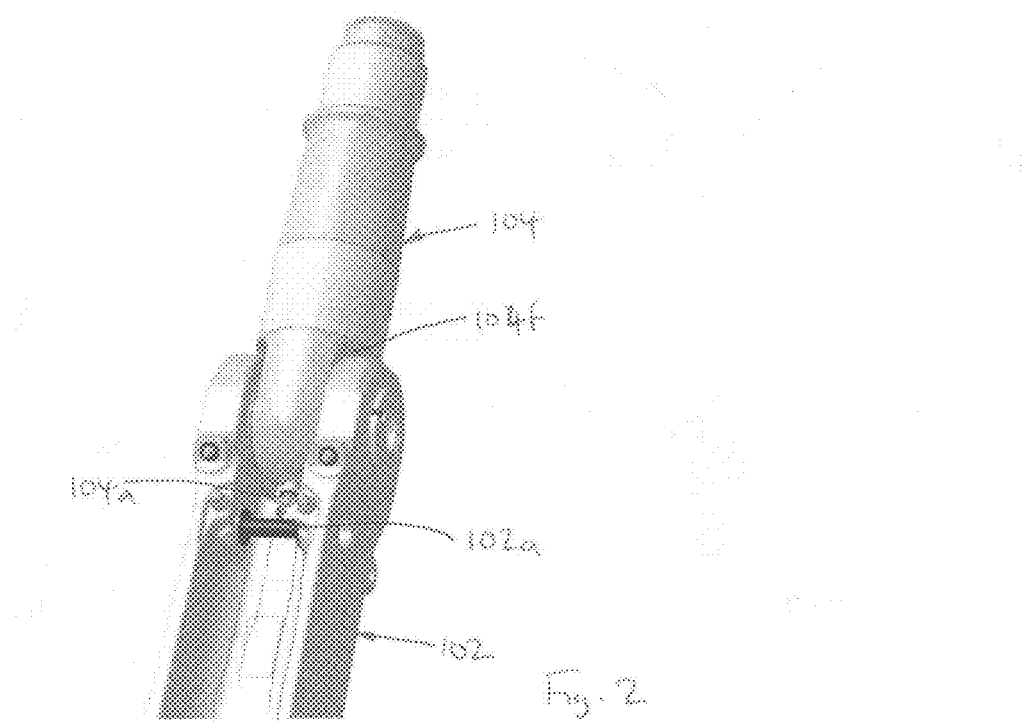

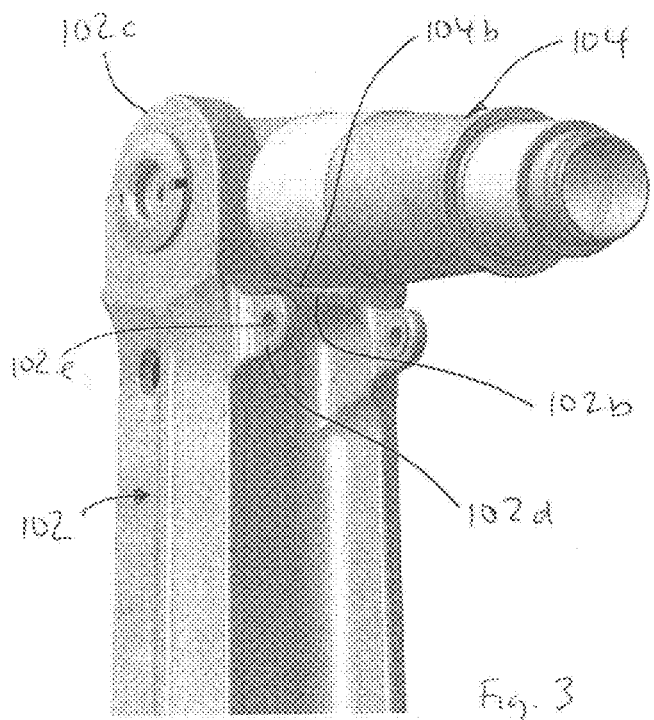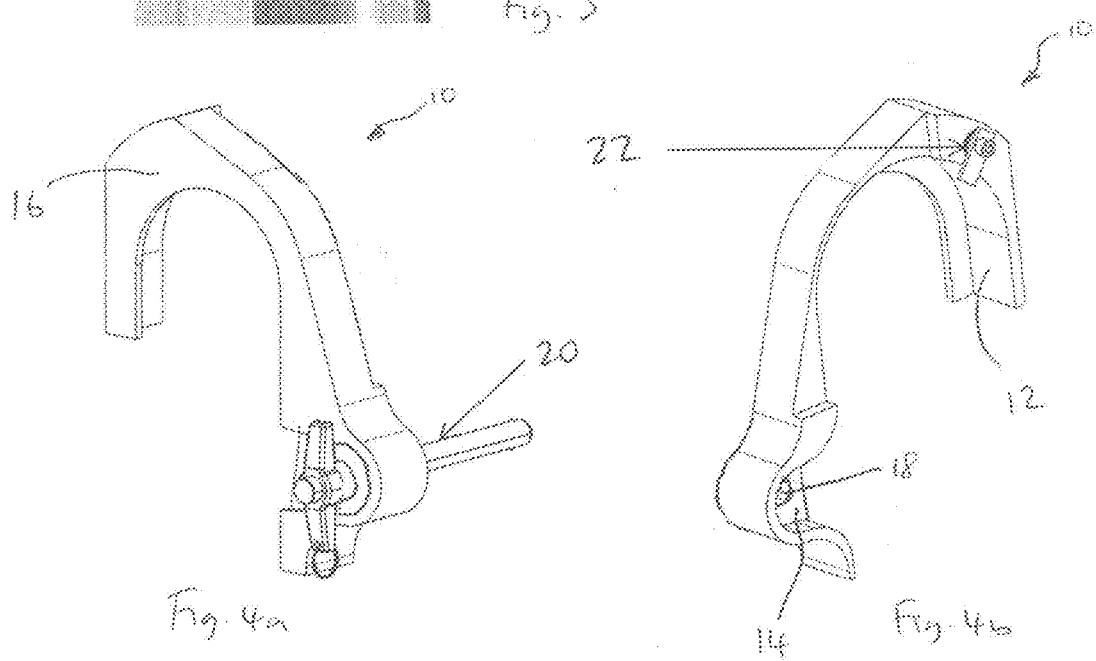

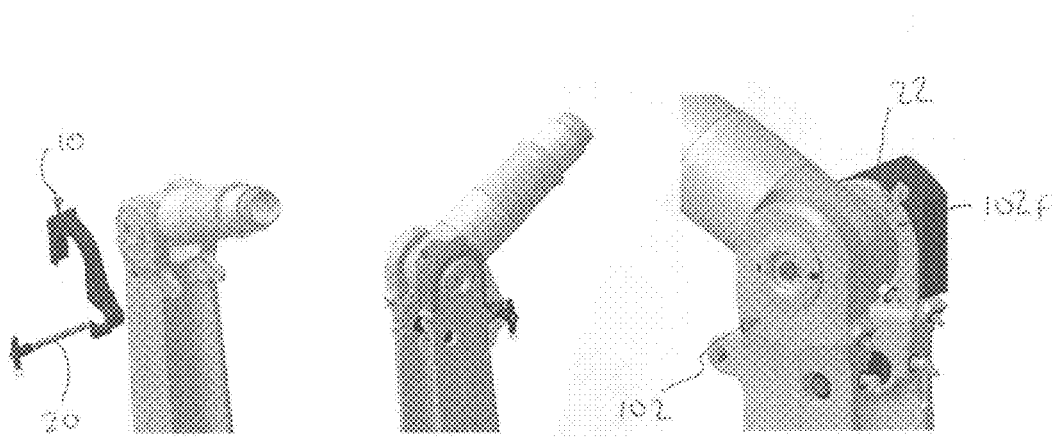
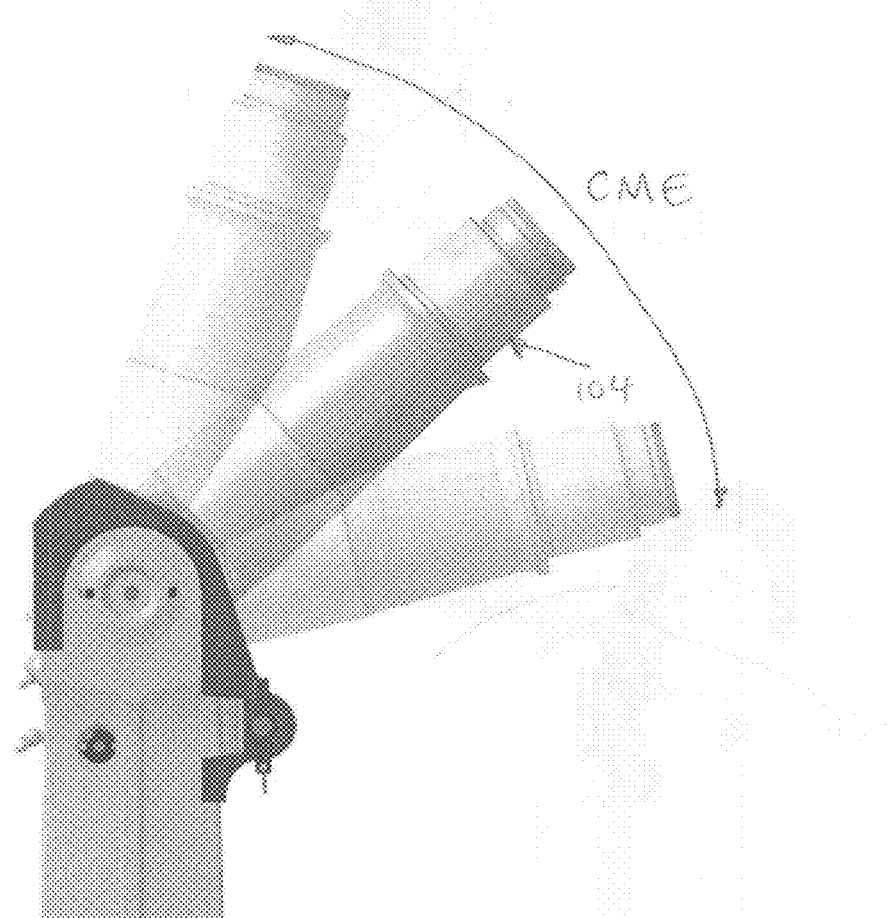

AIRCRAFT LANDING GEAR ASSEMBLY STOP MEMBER

This Application claims the priority to European Application 15150788.6, filed on Jan. 12, 2015, which is incorporated by reference herein.

BACKGROUND OF THE INVENTION

It is known for a landing gear assembly to include a first part that is movably coupled to a second part. In use, as the landing gear assembly moves between operational conditions, the second part moves relative to the first part throughout an operational movement envelope.

The coupling between the first and second parts may be such that the total movement envelope is larger than the operational movement envelope. As such, the second part is capable of moving relative to the first so as to assume a position that is outside of the operational movement envelope. Such as position will be referred to as a 'non-operational position'.

When arriving at an optimum strength to weight configuration for the landing gear assembly, the first part can clash with the second part if the second part is permitted to assume a hazardous non-operational position. Due to this, it is possible for a landing gear assembly to be damaged during installation into an aircraft.

SUMMARY OF THE INVENTION

In accordance with a first aspect of the present invention there is provided a stop member arranged to limit movement of a first part of an aircraft landing gear assembly relative to a second part of the aircraft landing gear assembly, the stop member comprising:

an engagement formation via which the stop member can be coupled to the first part of the aircraft landing gear assembly to be placed in a coupled condition; and first and second projections which when the stop member is in the coupled condition reside within a movement space corresponding to a volume swept by the second part as the second part moves relative to the first part throughout its total movement envelope, the projections being spaced from one another to define an unobstructed portion of the movement space between them within which the second part is free to move, each projection being arranged to inhibit movement of the second part beyond it so as to confine the second part to the unobstructed portion of the movement space.

Thus, the stop member can be coupled to the first part of the landing gear assembly to permit free movement of the second part relative to the first part in a plurality of directions within a confined portion of the movement space, inhibiting the second part assuming a hazardous position while facilitating easy assembly of the landing gear assembly into an aircraft.

The unobstructed portion of the movement space can be defined by a passage surface which connects the projections. This can simplify construction of the stop member and in some cases enable a unitary construction. However, the stop member can comprise two separate parts each with a projection and an engagement formation.

One or more of the projections can each define a gradient surface extending into the movement space so as to provide an increasing level of resistance to movement of the second part from the unobstructed portion of the movement space.

The first part can be pivotally coupled to the second part.

The first part can be arranged to move relative to the second part in a single movement plane.

The engagement formation of the stop member can be arranged to conform to an external surface profile of one or more portions of the first part.

The first part can comprise a stay member. The second part can comprise a cardan pivotally coupled to the stay member. The stop member can be provided with a hole positioned so as to align with a mounting lug for a down lock spring when the stop member is in the coupled condition. Thus, the stop member can be coupled to existing features of the landing gear assembly.

The stop member can include a movable locking tab having an unlocked position in which the stop member can be moved to and from the coupled condition, and a locked condition which inhibits uncoupling of the stop member from the coupled condition.

In accordance with a second aspect of the invention, there is provided an aircraft landing gear assembly including an aircraft landing gear assembly stop member according to the first aspect.

In accordance with a third aspect of the invention, there is provided an aircraft assembly including one or more aircraft landing gear assemblies according to the second aspect.

In accordance with a fourth aspect of the invention, there is provided a method of forming an aircraft landing gear assembly according to the second aspect, the method comprising the step of coupling a stop member according to the first aspect to a first part of an aircraft landing gear assembly.

In accordance with a further aspect of the invention, there is provided a method of forming an aircraft assembly according to the third aspect, the method comprising the steps of fitting one or more aircraft landing assemblies according to the second aspect to an aircraft assembly.

BRIEF DESCRIPTION OF THE DRAWINGS

Embodiments of the invention will now be described with reference to the accompanying drawings, in which:

FIG. 1 shows a known landing gear assembly;

FIG. 2 illustrates a clash between first and second parts of the landing gear assembly of FIG. 1;

FIG. 3 illustrates a clash between first and second parts of the landing gear assembly of FIG. 1;

FIGS. 4a and 4b show a stop member according to an embodiment of the invention;

FIGS. 5a to 5c show the stop member of FIGS. 4a and 4b being coupled to the landing gear assembly of FIG. 1;

FIG. 6. shows the stop member of FIGS. 4a and 4b coupled to the landing gear assembly of FIG. 1;

DETAILED DESCRIPTION OF EMBODIMENT(S)

Figure 7:
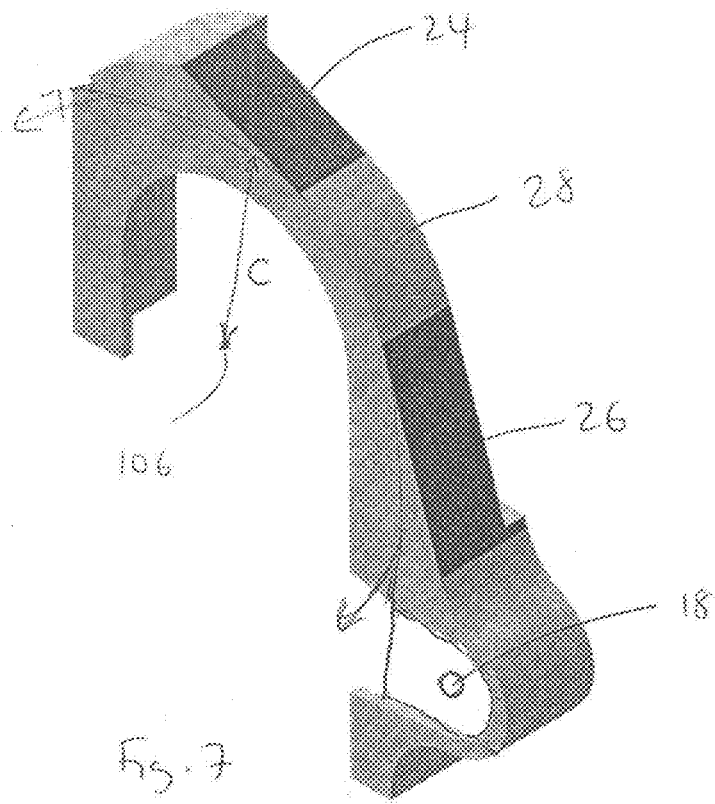
FIG. 7 illustrates the different regions of the control surface of the stop member of FIGS. 4a and 4b.

FIG. 1 shows an aircraft landing gear assembly 100 including a first part 102 movably coupled to a second part 104. In this example the first part 102 is an elongate arm of a side stay 102 and the second part 104 is a cardan pin 104 that is pivotally coupled to the stay arm 102 via a pivot pin 106. The stay arm 102 can be coupled to the airframe via the cardan pin 104.

The cardan pin 104 can move in a plane which is orthogonal with respect to the pivot axis of pin 106 throughout a movement or volume swept by the cardan pin 102 as the cardan pin 102 moves relative to the stay arm 102 throughout its total movement envelope TME.

In use, when the landing gear assembly 100 is installed in an aircraft (not shown), articulation constraints mean that the cardan pin 102 has an operational movement envelope OME which can be smaller than the total movement envelope TME. As such, within the total movement envelope TME there can exist non-operational zones NOZa, NOZb which flank the operational movement envelope OME.

When arriving at an optimum strength to weight configuration for the landing gear assembly 102, the first part 102 can clash with the second part 104 if the second part 104 is permitted to assume a position within a non-operational zone NOZa, NOZb. During assembly to an aircraft, the second part 104 is free to move relative to the first part 102 so that the second part 104 can be manipulated into a correct orientation for coupling to the aircraft. Due to this, it is possible for a landing gear assembly 100 to be damaged during installation. For example, as illustrated in FIG. 2, a cardan grease nipple 104a can clash with a portion 102a of stay arm 102 if the cardan 104 assumes a hazardous position within the first non-operational zone NOZa. Also, as illustrated in FIG. 3, a side portion of the cardan 104b can clash with a portion 102b of stay arm 102 if the cardan 104 assumes a hazardous position within the second non-operational zone NOZb.

Referring additionally to FIGS. 4a and 4b, a stop member 10 according to an embodiment of the invention is shown. As an overview, the stop member 10 is arranged to control the amount of free movement of the second part 104 to inhibit damage during installation.

The stop member 10 comprises an engagement formation 12, 14 via which the stop member 10 can be coupled to the first part 102 of the aircraft landing gear assembly 100 to be placed in a coupled condition.

The engagement formation in this example comprises recesses 12, 14 shaped to conform to an external surface profile of first part 102. The first recess 12 is shaped to conform to the side and top faces of an upper portion 102c of the stay arm 102. The second recess 14 is shaped to conform to a down lock spring lug. In this example, the front face 16 of the stop member 10 includes a hole 18 which is aligned with the second recess 14 so that a retaining bolt 20 can be inserted through the hole 18 and through a hole 102e in the lug 102d to lock the stop member 10 in the coupled condition, as illustrated in FIGS. 5a and 5b. A movable latch 22 can also be provided adjacent the first recess 12 to engage with an inner face 102f of the upper portion 102c of the stay arm 102, as illustrated in FIG. 5c. In other embodiments the engagement formation can take any suitable form; for example, a confirming surface arranged to form an interference fit with a portion of the first part 102 to hold the stop member 10 in place.

Referring additionally to FIG. 6, the stop member 10 is arranged to confine the second part 104 to movement within a confined movement envelope CME which is smaller than the total movement envelope TME and sized to inhibit the second part 104 entering hazardous areas within the non-operational zones NOZa, NOZb. The confined movement envelope CME can be larger than, equal to, or smaller than the operational movement envelope OME.

Referring additionally to FIG. 7, the stop member 10 includes a control surface 24, 26, 28. The projections 24, 26 project radially with respect the pivot axis 106 of the cardan pin 104 so as to be prominent relative to a radius C defined by the middle portion 28 of the control surface. When the stop member 10 is in the coupled condition, a shoulder portion 104f of the cardan pin 104 (illustrated in FIG. 2) is spaced from the pivot axis 106 by a radius which is greater than C, but less than that of the projections. The shoulder portion 104f moves relative the control surface 24, 26, 28 as the cardan pin 104 pivots. The projections 24, 26 reside within a movement space corresponding to a volume that would be swept by the cardan pin 104 as it moves relative to the stay arm 102 throughout its total movement envelope TME. The middle portion 28 of the control surface defines an unobstructed portion of the movement space within which the cardan pin 104 is free to move, equating to the confined movement envelope CME illustrated in FIG. 6. The projections 24, 26 are arranged to inhibit movement of the second part 104 beyond them so as to confine the cardan pin 104 to the confined movement envelope CME.

Figure 8:
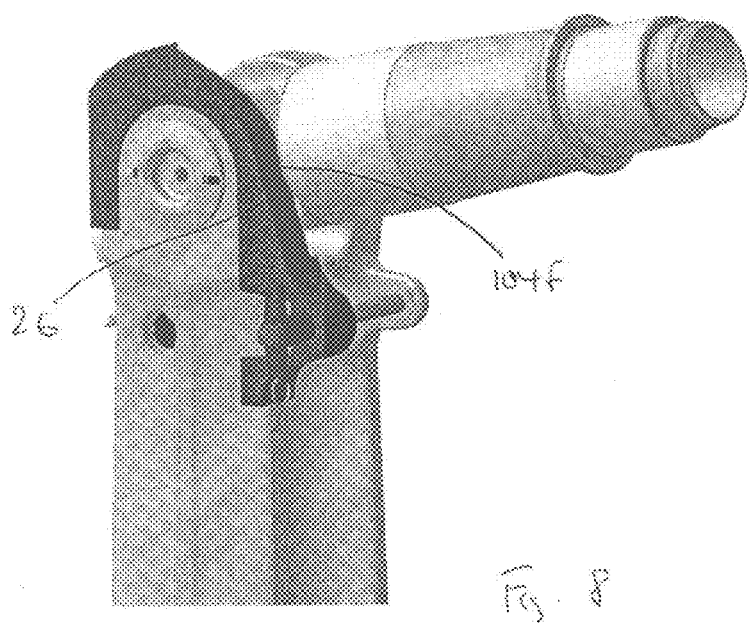
FIG. 8 illustrates the stop member of FIGS. 4a and 4b inhibiting a clash between first and second parts of the landing gear assembly of FIG. 1.

As illustrated in FIG. 8, the projection 26 contacts the shoulder portion 104f of the cardan pin 104 to inhibit the cardan pin 104 assuming a hazardous position within the non-operational zone NOZb.

Figure 9:
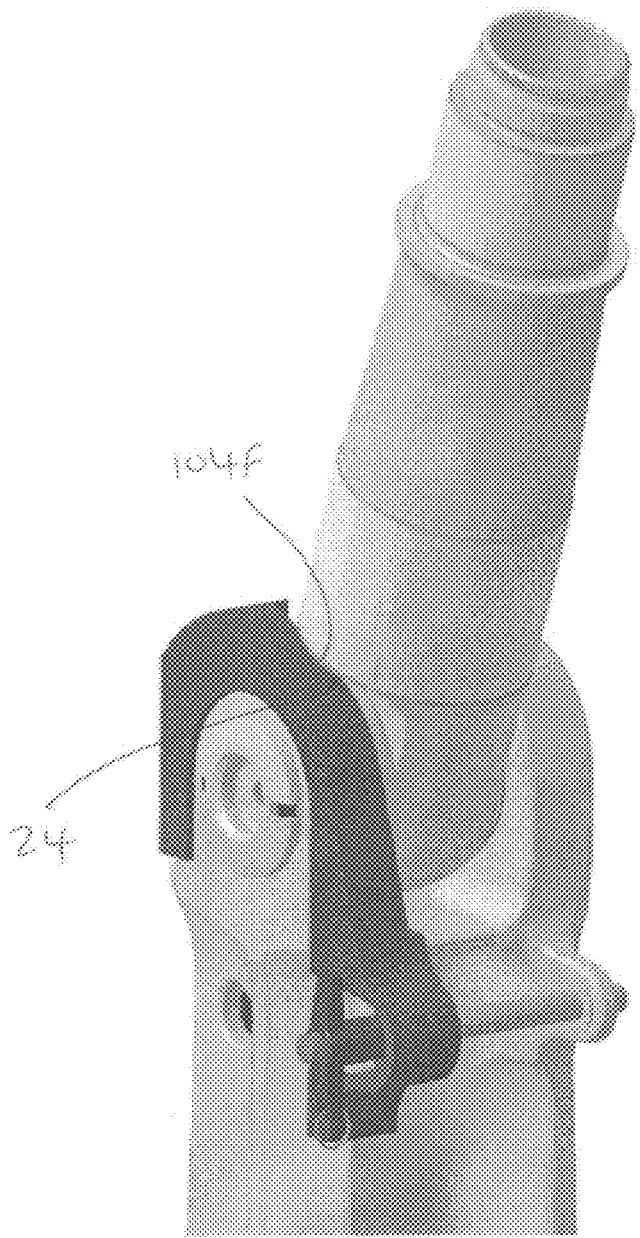
FIG. 9 illustrates the stop member of FIGS. 4a and 4b inhibiting a clash between first and second parts of the landing gear assembly of FIG. 1.

As illustrated in FIG. 9, the projection 24 contacts the shoulder portion 104f of the cardan pin 104 to inhibit the cardan pin 104 assuming a hazardous position within the non-operational zone NOZa.

Thus, a stop member 10 according to embodiments of the invention can be coupled to a first part 102 of a landing gear assembly 100 to permit free movement of a second part 104 relative to the first part 102 in a plurality of directions within a confined portion of the movement space. The stop member 10 therefore enables safe, unhindered assembly of the landing gear assembly 100 into an aircraft.

Referring back to FIG. 7, the projections 24, 26 each taper into the swept volume so as to provide an increasing level of resistance to movement of the cardan pin 104 from the confined movement envelope CME. However, in other embodiments the projections 24, 26 can take any suitable form.

In the illustrated example the stop member 10 has a unitary body, which can simplify manufacture.

In the illustrated example the stop member 10 is arranged to be coupled to a single side of the first part 102, which can make it easier for a worker to remove the stop member 10 once the cardan 104 has been coupled into the airframe, given the lack of space that exists within a landing gear assembly bay.

The stop member 10 according to embodiments of the present invention can be formed from any suitable material, such as a soft metal or a plastics material, such as nylon.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly stop member arranged to be coupled to an aircraft landing gear assembly prior to installation of the aircraft landing gear assembly into an aircraft and removed from the aircraft landing gear assembly once the aircraft landing gear assembly is installed in the aircraft, the stop member being arranged to limit movement of a first part of the aircraft landing gear assembly relative to a second part of the aircraft landing gear assembly, the stop member comprising:

an engagement formation via which the stop member can be removably coupled to the first part of the aircraft landing gear assembly to be placed in a coupled condition; and first and second projections which when the stop member is in the coupled condition reside within a movement space corresponding to a volume swept by the second part as the second part moves relative to the first part throughout its total movement envelope, the projections being spaced from one another within the movement space so as to define an unobstructed portion of the movement space between them within which the second part is free to move, each projection being arranged to inhibit movement of the second part beyond it so as to confine the second part to the unobstructed portion of the movement space.

2. An aircraft landing gear assembly stop member according to claim 1, comprising a recessed passage surface between the projections defining the unobstructed portion of the movement space.

3. An aircraft landing gear assembly stop member according to claim 1, wherein one or more of the projections each define a gradient surface extending into the movement space so as to provide an increasing level of resistance to movement of the second part from the unobstructed portion of the movement space.

4. An aircraft landing gear assembly stop member according to claim 1, wherein the first part is pivotally coupled to the second part.

5. An aircraft landing gear assembly stop member according to claim 1, wherein the first part is arranged to move relative to the second part in a single movement plane.

6. An aircraft landing gear assembly stop member according to claim 1, wherein the engagement formation of the stop member is arranged to conform to an external surface profile of one or more portions of the first part.

7. An aircraft landing gear assembly stop member according to claim 1, wherein the first part comprises a stay member.

8. An aircraft landing gear assembly stop member according to claim 7, wherein the second part comprises a cardan pin pivotally coupled to the stay member.

9. An aircraft landing gear assembly stop member according to claim 7, wherein the stop member is provided with a hole positioned so as to align with a mounting lug for a down lock spring when the stop member is in the coupled condition.

10. An aircraft landing gear assembly stop member according to claim 1, wherein the stop member includes a movable locking tab having an unlocked position in which the stop member can be moved to and from the coupled condition, and a locked condition which inhibits uncoupling of the stop member from the coupled condition.

11. An aircraft landing gear assembly comprising:

an aircraft landing gear assembly stop member coupled to the aircraft landing gear assembly prior to installation of the aircraft landing gear assembly into an aircraft and arranged to be removed from the aircraft landing gear assembly once the aircraft landing gear assembly is installed in the aircraft, the stop member being arranged to limit movement of a first part of the aircraft landing gear assembly relative to a second part of the aircraft landing gear assembly, the stop member comprising:

an engagement formation via which the stop member is removably coupled to the first part of the aircraft landing gear assembly to be placed in a coupled condition; and first and second projections which when the stop member is in the coupled condition reside within a movement space corresponding to a volume swept by the second part as the second part moves relative to the first part throughout its total movement envelope, the projections being spaced from one another within the movement space so as to define an unobstructed portion of the movement space between them within which the second part is free to move, each projection being arranged to inhibit movement of the second part beyond it so as to confine the second part to the unobstructed portion of the movement space.

12. A method of forming an aircraft landing gear assembly comprising the step of coupling a stop member according to claim 1 to a first part of an aircraft landing gear assembly.

* * * * *